Dec. 2, 1941.  J. FIEUX  2,265,106
HYDRODYNAMIC TACHOMETER
Filed March 10, 1939   2 Sheets-Sheet 1

Inventor
Jean Fieux.
By Cameron, Kerkam & Sutton.
Attorneys.

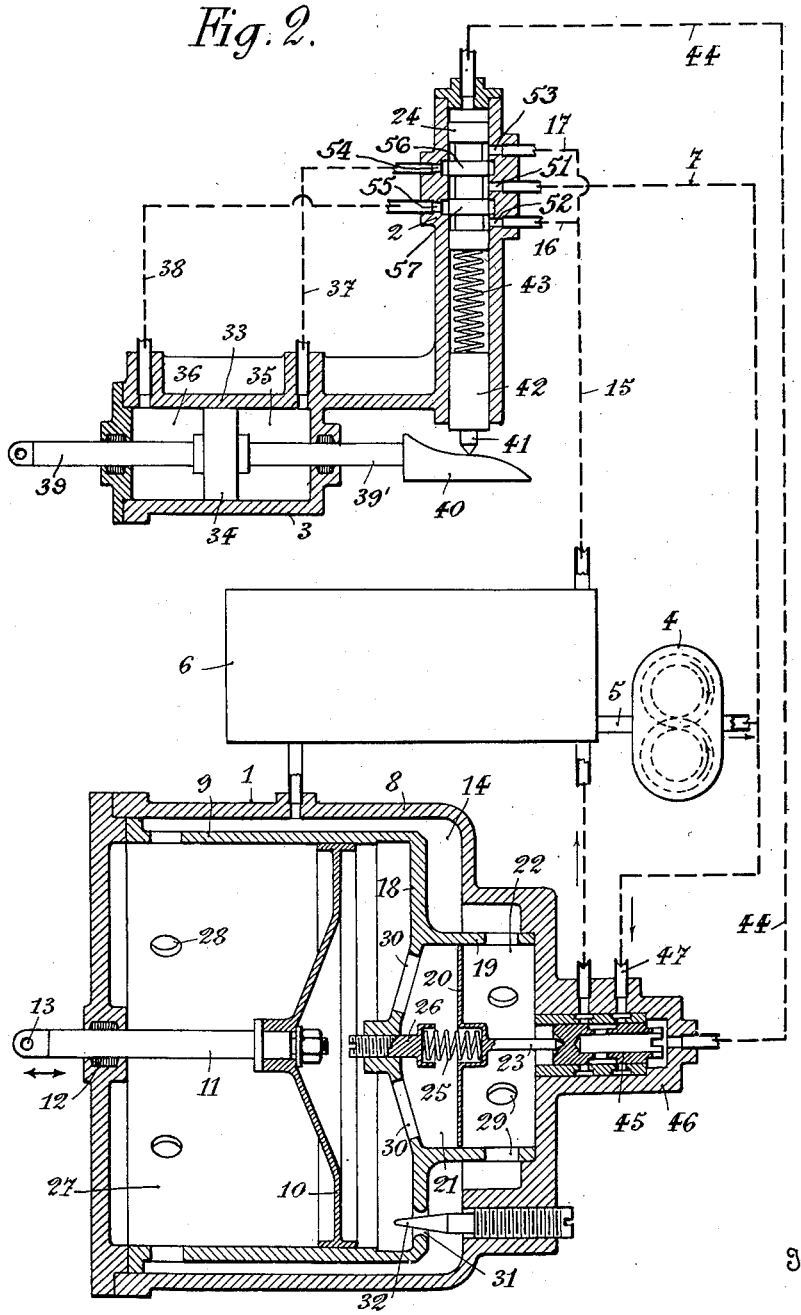

Patented Dec. 2, 1941

2,265,106

UNITED STATES PATENT OFFICE 2,265,106

HYDRODYNAMIC TACHOMETER

Jean Fieux, Paris, France, assignor of one-half to Schneider & Cie., Paris, France, a joint-stock company of France Application March 10, 1939, Serial No. 261,151
In France August 26, 1938

8 Claims. (Cl. 264—14)

It is already known to solve in various ways the problem which forms the first stage of tachometry and which consists in estimating and measuring at each instant the speed at which a given member is moving.

On the contrary, considerable difficulties have been encountered heretofore when it has been necessary to impress on a controlled member, the manipulation of which necessitates a relatively considerable expenditure of energy, movements such that its different positions corresponds to the different values assumed by the speed of a given directing member.

The electrical and electromagnetic devices proposed for attaining this result are extremely difficult if not practically impossible to use. Mechanical devices, which utilise the properties of gyroscopes and which give a satisfactory solution of the problem set, are not capable of being used in every case.

The present invention relates to a device whereby it is possible to solve the problem in a particularly simple manner, especially in the case where it is necessary to utilise directly or indirectly the speed of movement of a given directing member for working out the firing corrections to be effected when a gunner and an objective are moving in respect to one another at a relative speed, irrespective furthermore of which of the two is moving or even if both are moving (the case of firing from an aeroplane at another aeroplane).

The device referred to is based on the following principle.

It is known that if a piston in moving in the interior of a capacity which communicates with the exterior only through an orifice of small dimensions, aspirates or forces through the said orifice a practically incompressible fluid, with which the aforesaid capacity is already filled, the pressure in the interior of the said capacity remains permanently proportional to the square of the speed at which the said piston moves.

In order to solve satisfactorily the problem set, it is therefore merely necessary to associate with a pressure pot—the piston of which is suitably connected to the directing member, whose speed is to be estimated, measured and utilised and whose arrangement is such that it is possible to perceive at the exterior and translate in the form of active pressure or thrust, the pressure prevailing in the interior of the capacity, the movements of the piston of which influence the volume—a functional servo-motor device which is connected to the aforesaid pot so as to receive its impulses directly or indirectly, and which is constructed in such a manner as to return to the linear form the function of the second degree, represented by the impulses transmitted to it, and of course in such a manner as to transform the said impulses simultaneously into impulses adapted to be used for the control of the mechanism on which it is necessary to act.

With a view to ensuring satisfactory operation of the device, the pressure pot is constructed and arranged in such a manner that the fluid employed circulates continuously in a closed circuit, in a constant total volume, with practically negligible losses, and in such a manner that the changes in pressure which correspond to the changes in speed of the directing member are produced as an addition to or deduction from a given positive value corresponding to zero speed; that is to say, in fact, the device is a displaced zero device.

When the device has to be employed for action at a distance, the base combination is completed by the addition—between the pressure pot and the pipe line, the purpose of which is to transmit to the piston of the distributor of the servo-motor the impulses of thrusts furnished by the said pot—of a compensating relief device, to the piston of which the thrust effectively furnished by the pressure pot is directly applied.

Two constructions of the invention are shown in the accompanying drawings and described hereinafter, but of course these constructions may be modified in details and may be completed by any useful accessory device without for that purpose departing from the invention.

In the drawings,

Figure 2 shows the diagram of an installation in which the servo-motor is assumed to be situated at a certain distance from the fluid transformer.

Figure 1:
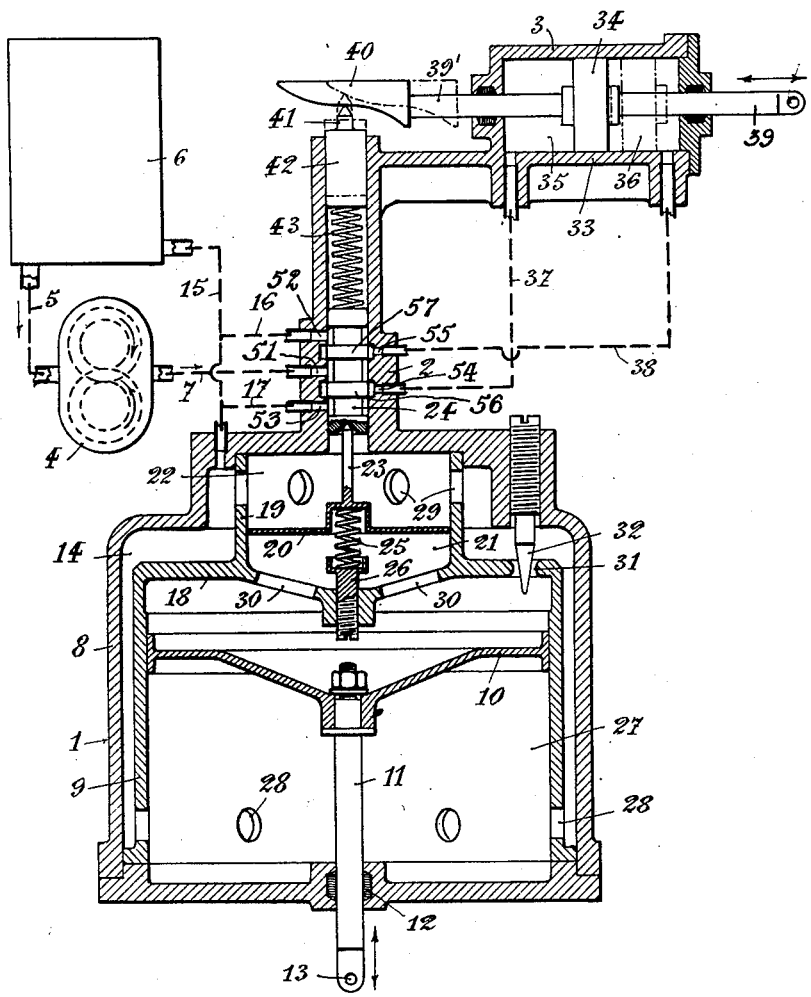
Figure 1 shows the diagram of a form of construction in which the fluid transformer and the functional servo-motor are directly associated with one another.

As will be seen in Figure 1, the first form of construction of the hydrodynamic tachometer according to the invention comprises a fluid pressure pot 1 on which is mounted directly the distributor 2 of a servo-motor 3, the assemblage formed by these devices being fed by means of a pump 4 of the rotary, constant pressure type which, through the medium of a pipe line 5, draws from a tank 6 the fluid employed, which may be water, oil or other suitable practically incompressible fluid, and forces it through the pipe line 7 into the distributor 2 through the port 51.

The pressure pot 1 comprises an outer casing 8, in the interior of which is provided a cylinder 9 wherein is adapted to move a piston 10 whose rod 11, which issues from the casing 8 through a gland 12, may be coupled by its eye 13 to the member of which it is desired simultaneously to measure the speed and to transform the changes of speed into control impulses. For example, when the tachometer of the present invention is embodied in a system for controlling the fire of artillery, the rod 11 may be operatively connected to a target observing telescope so as to follow the movements of the latter in either azimuth or elevation.

The space 14 comprised between the outer casing 8 and the cylinder 9 communicates freely with the tank 6 through a pipe line 15, which likewise serves as a discharge pipe line for the two exhaust pipe lines 16 and 17 connected to ports 52 and 53, respectively, of the distributor 2.

In addition to the cylindrical part, in the interior of which the piston 10 moves, the cylinder 9 comprises an end 18 and a cylindrical extension 19, in the interior of which is provided a diaphragm 20 forming a movable partition between the space 21 situated between it and the piston 10, on the one hand, and the space 22, on the other hand.

At its central part, the diaphragm 20 carries a push rod 23 through the medium of which it bears against the piston 24 of the distributor 2. It is furthermore subjected to the action of a spring 25 bearing on an adjustable stop 26 mounted in the centre of the partition 18 of the cylinder 9.

The space 27 beneath the piston 18 communicates with the space 14 comprised between the outer casing 8 and the cylinder 9 through the medium of openings 28 provided in the lateral cylindrical wall of said cylinder.

The space 22 above the diaphragm 20 communicates with the same space 14 through the medium of orifices 29 provided in the cylindrical lateral wall of the extension 19.

With orifices 30 establishes permanent communication between the two upper and lower elements of the space 21 which lies between the piston 10 and the diaphragm 20. The said space in addition communicates with the space 14 through the medium of a calibrated orifice 31 through which passes a conical calibrated point 32 having its position adjustable in such a manner that the space comprised between its surface and the edges of the orifice 32 may, for effecting the adjustments, be diminished or increased at will.

The servo-motor 3 comprises in known manner a cylindrical casing 33 in the interior of which is adapted to move a piston 34 situated between two chambers 35 and 36 communicating respectively with the ports 54 and 55 of the distributor 2 through the medium of the two pipe lines 37 and 38. The rod 39 of the piston 34 may be suitably connected in any desired manner by the mechanism which is to be controlled by, or moved to indicate the variations in speed or velocity of, the directing or controlling member by which the piston 10 is actuated. In a fire control system, this connection might be made to an indicator, for example, as illustrated in my Patent No. 2,106,998.

The reaction rod 39' of the piston 34 carries a cam 40, the profile of which is symmetrical relatively to its middle point and is constituted by two similar parabolic branches. The said cam acts on the point 41 of the slide 42 which, through the medium of the spring 43, re-acts on the piston 24 of the distributor for returning it to the position of equilibrium, that is to say, to the closure position.

The operation of the device is as follows:

When the piston 10 is stationary and irrespective of the position in which it is stopped, all the other members of the device are in the position in which they are shown in solid lines in Figure 1, the enlarged portions 56 and 57 of the distributor piston 24 closing the ports 54 and 55 so as to prevent the delivery of fluid to the servo-motor, the pump 4 delivering back to itself and the compression of the spring 25 exactly balancing that of the spring 43.

Immediately, however, on being driven by the directing member to which it is connected, the piston 10 commences to move, it modifies the volume of the space 21 and according to the direction in which it moves it aspirates or forces a certain quantity of fluid through the calibrated orifice 31. It will be understood, of course, that the speeds at which the piston 10 moves during operation of the device are always substantially less than that at which cavitation would occur.

Owing to the resistance to flow (loss of head), due to the small dimensions of the orifice 31, there is produced between the pressures exerted respectively on the two faces of the diaphragm 20, a certain difference which, according to the case, is added to the action exerted by the spring 25 or is deducted therefrom.

It follows that the pressure or thrust exerted by the push rod 23 on the piston 24 of the distributor 2 ceases to balance exactly the antagonistic action exerted on the same piston by the spring 43.

The piston 24 is in consequence constrained to move either upwardly or downwardly so as to permit a certain quantity of the fluid furnished by the pump 4 to enter one of the chambers of the servo-motor and a certain quantity of the fluid contained in the opposite chamber to return to the tank 6. For example, if the piston 24 moves upwardly, the ports 51 and 55 are placed in communication so as to deliver fluid to chamber 36 through pipe line 38, while at the same time communication is established between ports 53 and 54 whereby fluid from chamber 35 is returned to the tank 6 through pipe lines 37, 17 and 15. Downward movement of the piston effects the supply of fluid to chamber 35 through ports 51 and 54 and pipe line 37, the return to tank 6 being from chamber 36 through pipe line 38, ports 55 and 52, and pipe lines 16 and 15.

Immediately, however, under the action of this admission and escape of fluid, the piston 34 of the servo-motor 3 commences to move, the cam 40 which it drives in its movement forcing back the slide 42 or allowing it to emerge, according to the case.

There is consequently produced a modification of the compression of the spring 43, said modification being effected in the sense for which it tends to balance the thrust applied by the push rod 23 to the piston 24 of the distributor 2. that is to say, the total action resulting both from the compression of the spring 25 and from the difference in pressure applied to the two faces of the diaphragm 20 due to the movements of the piston 10.

The piston 24 of the distributor 2 therefore tends to return to the position in which it closes the pipe lines for the admission and return of the fluid pumped by the pump 4.

If, at this moment, a fresh variation is produced in the difference in pressure applied to the two faces of the diaphragm 20, a new change of position of the piston 34 is produced and so forth, but, as soon as the piston 10 moves at a uniform speed corresponding to a constant loss of head through the orifice 31, the difference in pressure applied to the two faces of the diaphragm 20 is stabilised at a constant value, and the piston 34 of the servo-motor is stabilised in the position to which it has been moved, the position shown in chain lines in Figure 1 of the drawings, for example.

If, on the contrary, the speed at which the piston 10 moves undergoes a fresh change, the piston 34 also again undergoes a change in position.

Finally, if the piston 10 stops, that is to say, if its speed becomes zero, equilibrium is established for the position in which the difference in pressure on the two faces of the diaphragm 20 is zero, that is to say, the position for which the thrust exerted by the push-rod 23 on the piston 24 of the distributor 2 is equal to the adjustment compression of the spring 43, that is to say, to the mean or original position of the piston 24, for which position the push-rod 41 bears against the middle point of the cam 40, said middle point being the point of symmetry of the rise of the said cam. The communication established between the pipe line 15 and the space 14 is solely for the purpose of compensating any slight losses which may be produced.

The orifices 28 and the orifices 29, by permitting the fluid to arrive freely behind the piston 10 and behind the diaphragm 20, eliminate any accessory resistance effect capable of disturbing the operation of the apparatus.

For regulating the proportional ratio between the speeds of movement of the piston 10 and the pressure differences applied to the two faces of the diaphragm 20, the dimensions of the calibrated orifice 31 are increased or reduced by adjusting the calibrated point 32.

In the construction shown in Figure 2, the servo-motor 3 is assumed to be situated at a certain distance from the pressure pot 1. The impulse or thrust furnished by the latter is then transmitted to the servo-motor through the medium of a pipe line 44, but to enable this pipe line to act suitably as an integral and neutral transmitter in the desired manner, it is indispensable that it should form a perfect neutral connection between the push-rod 23 and the piston 24 of the distributor 2.

It is therefore necessary that the pressure of the fluid which it contains should be exactly adapted both to the thrust of the push-rod 23 and to the reaction of the piston 24, which is in fact that of the spring 43. To achieve this result, the push-rod 23 is caused to act on the distributor piston 45 of a compensating relief device 46 fed at 47 by the pump 4, which is selected so as to be of generous capacity, that is to say, so as to be able to furnish a supply very much greater than that normally required of it and to be able to furnish said supply under a pressure definitely greater than all the pressures involved in the whole of the apparatus. Due to the intervention of this supplementary member, the impulses or thrusts furnished by the push-rod 23 are transmitted with perfect flexibility and fidelity to the piston 24 of the distributor 2.

The device as a whole operates exactly in the same way as in the preceding case, except that the two distributor pistons 24 and 45 associate their movements so as to attain simultaneously their position of equilibrium, that is to say, the position for which they ensure complete closure of the different pipe lines passing to the servo-motor 3, to the pump 4 and to the tank 6.

What I claim is:

1. In a hydrodynamic tachometer of the character wherein the movements of the piston of a servo-motor from a central or neutral position are adapted to indicate or utilise the speed of movement of a controlling member, the combination of a casing, a cylinder within said casing, a piston in said cylinder adapted to be moved by said controlling member, an imperforate, movable diaphragm closing said cylinder on one side of said piston, a spring continually urging said diaphragm away from the piston, both said casing and said cylinder being completely filled with a substantially incompressible fluid medium, means providing relatively restricted fluid communication between said casing and the space within said cylinder between said diaphragm and said piston, means providing relatively unrestricted fluid communication between said casing and the space on the other side of said piston, means for supplying an actuating fluid to said servo-motor including a source of said fluid and a distributor of the cylinder and piston valve type for controlling the supply thereof to said servo-motor, means for transmitting the thrust of said spring as modified by the pressure on said diaphragm to the piston valve of said distributor, a second spring for urging said piston valve in a direction opposite to that in which it is urged by the thrust of said first named spring and diaphragm, and means actuated by the piston of said servo-motor for varying the force exerted by said second spring in substantially parabolic relation to the amount of displacement of said piston from its neutral position.

2. A hydrodynamic tachometer according to claim 1 wherein the means for transmitting the thrust of said first named spring and diaphragm to the piston valve of the distributor comprises a rod of fixed length interposed between said diaphragm and said valve.

3. A hydrodynamic tachometer according to claim 1 wherein the means for transmitting the thrust of said first named spring and diaphragm to the piston valve of the distributor comprises a closed conduit system completely filled with a substantially incompressible fluid medium connected at one end with the cylinder of said distributor in which said piston valve is movable, and a compensating relief device having a cylinder to which the other end of said conduit system is connected and a piston to which the thrust of said spring and diaphragm is directly applied.

4. A hydrodynamic tachometer according to claim 1 wherein the means for transmitting the thrust of said first named spring and diaphragm to the piston valve of the distributor comprises a piston to which said thrust is directly applied, a cylinder wherein said piston is movable, a closed conduit system connecting the end of said cylinder with the cylinder of said distributor in which said piston valve is movable, said conduit system being completely filled with a substantially incompressible fluid medium, and means controlled by the movements of said piston for connecting said closed conduit system to the source of supply of the fluid which actuates the servo-motor.

5. In a hydrodynamic tachometer of the character wherein the movements of the piston of a servo-motor from a central or neutral position are adapted to indicate or utilise the speed of movement of a controlling member, the combination with a distributor of the piston valve type for controlling the supply of actuating fluid to said servo-motor of a casing, a cylinder within said casing, a piston in said cylinder adapted to be moved by said controlling member, an imperforate, movable diaphragm closing said cylinder on one side of said piston, a spring continually urging said diaphragm away from the piston, both said casing and said cylinder being completely filled with a substantially incompressible fluid medium, means providing relatively restricted fluid communication between said casing and the space within said cylinder between said diaphragm and said piston, means providing relatively unrestricted fluid communication between said casing and the space on the other side of said piston, and means for transmitting the thrust of said spring as modified by the pressure on said diaphragm to the piston valve of said distributor.

6. In a hydrodynamic tachometer of the character wherein the movements of the piston of a servo-motor from a central or neutral position are adapted to indicate or utilise the speed of movement of a controlling member, the combination with a distributor of the piston valve type for controlling the supply of actuating fluid to said servo-motor of a cylinder, a piston in said cylinder adapted to be moved by said controlling member, said cylinder having an extension at one end thereof of reduced diameter, an imperforate, movable diaphragm mounted in said extension closing said cylinder on one side of said piston, means including a spring of variable compression continually urging said diaphragm away from the piston, a casing surrounding said cylinder and extension, both said casing and said cylinder, including said extension, being completely filled with a substantially incompressible fluid medium, an orifice of relatively restricted, adjustable size providing fluid communication between said casing and the space within said cylinder between said diaphragm and said piston, means providing relatively unrestricted fluid communication between said casing and the space on the other side of said piston, and means for transmitting the thrust of said spring as modified by the pressure on said diaphragm to the piston valve of said distributor.

7. In a hydrodynamic tachometer of the character described, the combination of a directing member, a servo-motor having a piston the movements of which from a central or neutral position correspond to a linear function of the movements of said directing member, means for actuating said servo-motor including a source of actuating fluid, a pump and a distributor of the cylinder and piston valve type interposed between said pump and said servo-motor for controlling the supply of actuating fluid thereto, a pressure cylinder filled with a substantially incompressible fluid medium, a piston in said cylinder connected to and movable with said directing member, means permitting a restricted flow of said substantially incompressible fluid from one side to the other of said piston when the latter moves in said cylinder, means for transmitting the pressure created in said cylinder by movement of said piston to one end of the piston valve of said distributor, and means for exerting a counter-pressure against the opposite end of said piston valve including a spring thrusting against said valve and means actuated by the piston of said servo-motor for varying the force exerted by said spring against said piston valve in substantially parabolic relation to the amount of displacement of said servo-motor piston from its neutral position.

8. A hydrodynamic tachometer according to claim 7 wherein said force varying means actuated by the servo-motor piston comprises a cam movable with said piston, and a follower member interposed between said cam and the end of said spring opposite to that which thrusts against said piston valve, the profile of said cam comprising a pair of similar substantially parabolic surfaces symmetrical with respect to a central or neutral point.

JEAN FIEUX.